Aug. 19, 1969 S. P. THOMPSON 3,462,285
ELECTROMAGNETIC FUSION OF THERMOPLASTIC PRINTING
Filed Nov. 2, 1964 2 Sheets-Sheet 1

INVENTOR.
S. P. THOMPSON
BY Young & Quigg
ATTORNEYS

Aug. 19, 1969     S. P. THOMPSON     3,462,285
ELECTROMAGNETIC FUSION OF THERMOPLASTIC PRINTING
Filed Nov. 2, 1964     2 Sheets-Sheet 2

INVENTOR.
S. P. THOMPSON
BY
*Young & Quigg*
ATTORNEYS

United States Patent Office 3,462,285
Patented Aug. 19, 1969

3,462,285
**ELECTROMAGNETIC FUSION OF THERMO-
PLASTIC PRINTING**
Stanley P. Thompson, Bartlesville, Okla., assignor to Phillips Petroleum Company, a corporation of Delaware
Filed Nov. 2, 1964, Ser. No. 408,297
Int. Cl. G03g *17/00, 19/00;* B44d *1/094*
U.S. Cl. 117—17.5
8 Claims

ABSTRACT OF THE DISCLOSURE

An image of thermoplastic ink is formed on a substrate by a suitable procedure, for example by selectively electrostatic charging the substrate and contacting the thus selectively charged substrate with the thermoplastic ink. The ink contains a component which has an absorption factor for electromagnetic energy substantially greater than the absorption factor of the substrate. The ink image is fused to the substrate by subjecting the substrate having the ink image thereon to electromagnetic energy to selectively heat the ink to fuse the ink without causing deformation of the substrate.

---

Figure 1:
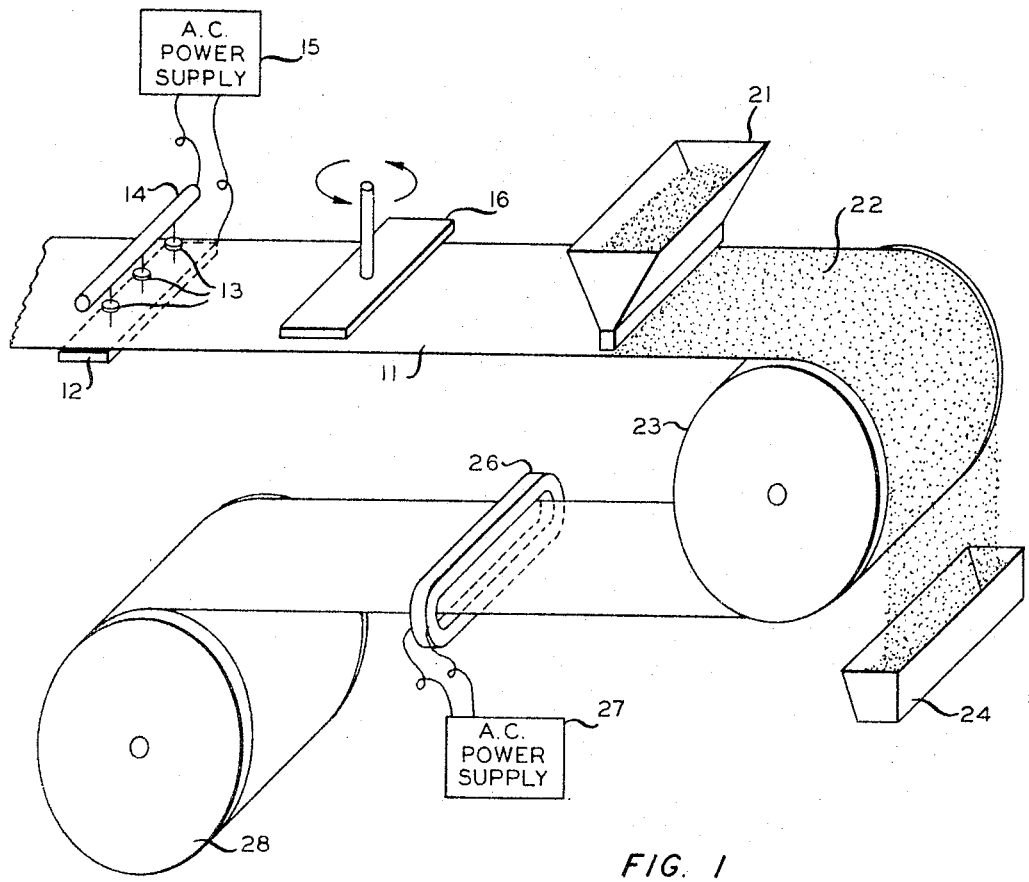

This invention relates to a method for printing a design formed of thermoplastic material on a substrate and fusing the thermoplastic design to the substrate with electromagnetic heat.

One of the major difficulties encountered in the use of thermoplastic materials for packaging is graphic decoration. Plastic containers and film have won wide acceptance as packaging materials because of their light weight, flexability, unbreakableness, and low cost. However, despite all of the advances made in producing more suitable plastics from the standpoint of processing the plastic into the container or film, relatively little progress has been made in the area of graphic decoration or printing of the plastic container or film. The chipping, smudging and running of conventional printing inks when applied to thermoplastic material has thwarted conventional printing processes which enjoyed great success with paper and similar materials. As a result many uses of thermoplastic packaging materials require the utilization of paper labels which have to be glued to the packaging material. Paper labels permit greater fidelity of reproduction, but are limiting in that they must be designed within a confining die cut shape. Another problem encountered in printing on thermoplastic materials is the deformation of the substrate when heated to dry printing inks.

Accordingly, it is an object of the invention to provide a novel and improved process for printing thermoplastic materials. Another object of the invention is to provide a process for printing directly on a substrate a design which will not run, chip or smudge. Yet another object of the invention is to provide an improved process for printing on thermoplastic materials where the printed image is fused with thermoplastic substrate without deformation of the substrate. A further object of the invention is to provide a printed design which resists scratching and scuffing. Another object of the invention is to provide a process for printing a design with a high degree of adhesion.

Other aspects, objects and advantages of the invention will be apparent from a study of the disclosure, the drawings and the appended claims.

In accordance with the invention it has been discovered that these objects can be achieved by utilizing a printing "ink" of thermoplastic material containing at least one component which produces heat responsive to electromagnetic energy. In one embodiment the printing ink of the invention comprises finely divided particles of thermoplastic material having admixed therewith or incorporated therein finely divided particles of an organic or inorganic material having a high absorption factor for electromagnetic energy in comparison to the absorption factor of the substrate. The electromagnetic energy can be provided by microwave radiation, dielectric heating or induction heating. In another embodiment the "ink" comprises a thermoplastic material which has an absorption factor for the electromagnetic energy considerably higher than the absorption factor of the substrate.

Figures 2, 3, 4:
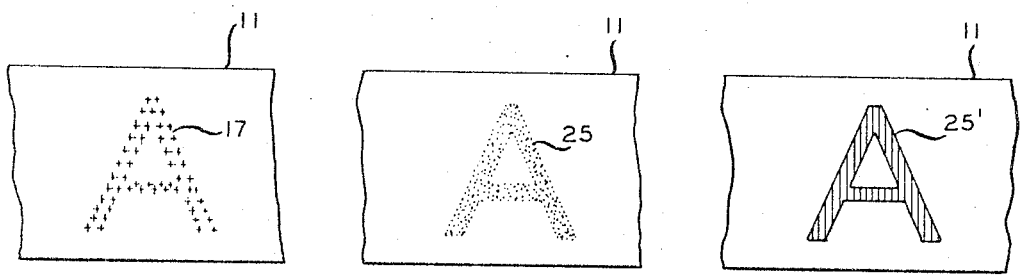
Figure 7:
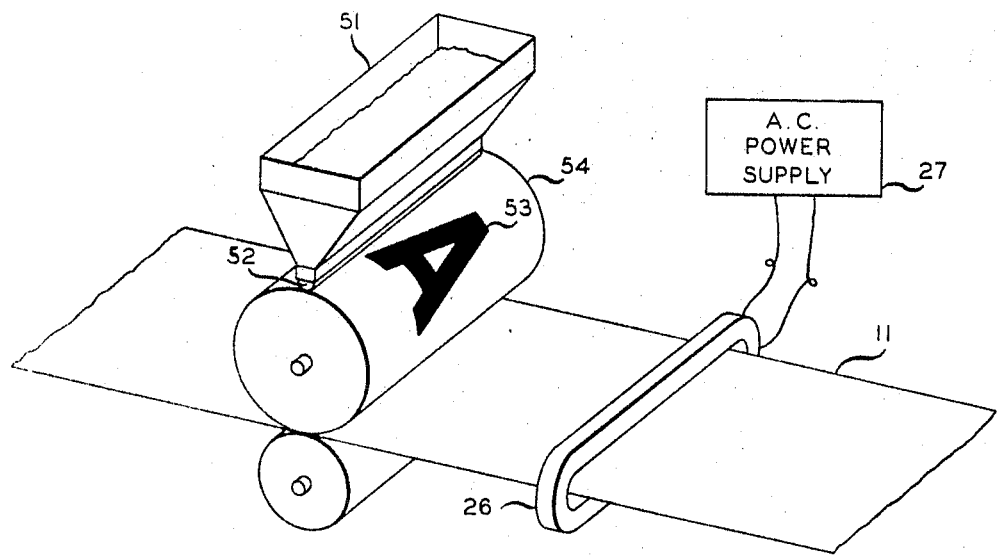
Figure 5:
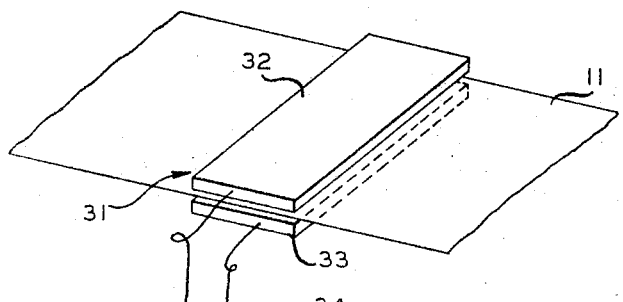
Figure 6:
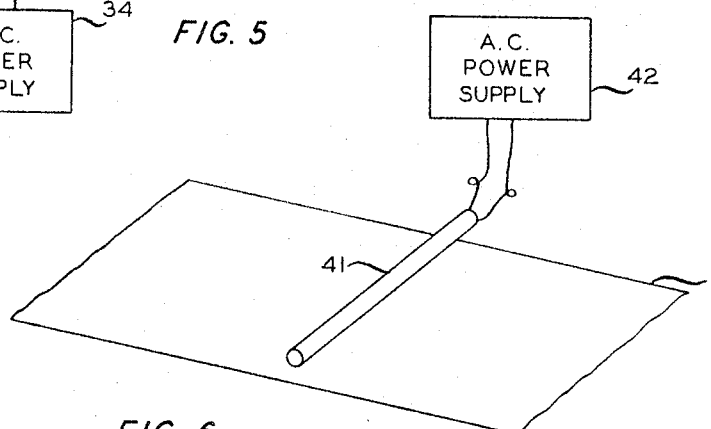

In the drawings FIGURE 1 is a diagrammatic representation of one embodiment of the invention utilizing induction heating; FIGURES 2, 3, and 4 are pictorial representations of the substrate at various stages of the printing process; FIGURES 5 and 6 are diagrammatic representations of modifications of FIGURE 1 for dielectric heating and microwave heating respectively; and FIGURE 7 is a diagrammatic representation of another embodiment utilizing a liquid solution or dispersion of a thermoplastic ink in accordance with the invention.

Referring now to the drawing and to FIGURE 1 in particular, a substrate film 11 passes over a plate 12 of electrically conducting material. A plurality of corona discharge needles 13 are positioned above plate 12 and film 11 and spaced apart along the width of film 11 by a supporting element or bar 14. Plate 12 and bar 14 are connected to output terminals of high frequency A.C. power supply 15. Elements 12, 13, 14 and 15 constitute an electrostatic charging device and function to spray electrostatic charges across the upper surface of film 11. Film 11 containing the electrostatic charges then passes under an image plate 16. Plate 16 has a "negative" image formed in its lower face. In one type plate 16 is formed of electrically conducting material and the areas of the lower face of plate 16 corresponding to areas to be printed are recessed from the areas which correspond to areas to be free of ink. In a second, single plane type the areas of the lower face of plate 16 corresponding to areas to be printed are formed on electrically non-conducting material while the areas of plate 16 corresponding to areas to be free of ink are formed of electrically conducting material. Plate 16 is moved downwardly into contact with the upper surface of film 11 to create a "positive" electrostatic image on film 11 corresponding to the "negative" image on plate 16. The "positive" and "negative" images refer to photographic positive and negative images rather than the polarity of the electrostatic charges. The positive image is formed by the contact of the electrically conducting portions of the negative image against the upper surface of film 11 to neutralize the electrostatic charges in the areas of film 11 which are to be free of ink. An example of the resulting electrostatic image 17 on film 11 is illustrated in FIGURE 2. While image 17 is shown composed of positive charges, negative charges are also effective. While it is within the contemplation of the invention to feed film 11 in a stepwise manner and reciprocate plate 16 only in the vertical plane, it is presently preferred to feed film 11 in a smooth and continuous manner and to move plate 16 in an approximately elliptical path downward into contact with the upper surface of film 11 with a simultaneous horizontal movement in the direction of movement of film 11 at the same speed as film 11. At the end of the desired contact time plate 16 is moved upwardly out of contact with film 11 and then horizontally in the direction opposite the direction of travel of film 11 to the starting point. The mechanical means for performing this motion of plate 16 is well known and is omitted for the sake of simplicity. Plate 16 can also be in the form of a rotary press having a cylindrical printing plate.

The film 11 having the electrostatic charge image thereon passes under "ink" hopper 21 which distributes an even layer 22 of a solid particulate "ink" in accordance with the invention across the upper surface of film 11. The hopper 21 extends across the width of film 11 and is preferably a gravity distributor for reasons of simplicity and ease of operation; however, any type of feeding means can be utilized. Film 11 having a layer 22 of particulate ink solids thereon passes over and around roller 23. As film 11 passes downwardly around roller 23 the particulate ink solids on the "no-ink" areas of film 11 do not adhere to film 11 and fall freely into receiver 24 below roller 23. The particulate ink solids can be withdrawn from receiver 24 and returned to hopper 21 for further use, if desired. The particulate ink solids in the "ink" areas of film 11 are held to film 11 by the presence of the electrostatic charges which form the electrostatic image. The section of the lower surface of film 11 just downstream of roller 23 corresponding to the section of FIGURE 2 is illustrated in FIGURE 3. The image 25 of the letter "A" is formed by the particulate ink solids held to film 11 by the electrostatic charges in the electrostatic image 17. The electrostatic charges in the areas outside the letter "A" were neutralized by plate 16, and the particulate ink solids which were deposited in these neutralized areas have fallen into receiver 24.

Film 11 having image 25 thereon passes through an inductance heater coil 26 which is powered by an A.C. power supply 27. Film 11 is formed of an electrically nonconductive material and thus is not significantly heated directly by the electromagnetic energy emitted by inductance coil 26. Materials suitable for use in film 11 include polymers of olefins, polymers of substituted olefins, polyamides, polycarbonates, polyethers, acetal resins, thermoplastic cellulose, copolymers, and paper. Specific examples include polymers of one or more of the following monomers: olefins such as ethylene, propylene, 1-butene, 1-pentene, 4-methyl-1-pentene, 1-heptene, 1-octene, 1-decene, 3-phenylpropene-1, vinylcyclohexane, and the like; conjugated dienes such as 1,3-butadiene, 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, 2-ethoxy-1,3-butadiene, methylchloroprene (2-chloro - 3-methyl-1,3-butadiene), and the like; aryl substituted olefins such as styrene; various alkyl styrenes such as o-ethylstyrene, m-tetradecylstyrene, and the like; p-chlorostyrene, p-vinylstyrene, m-methoxy-p-isopropylstyrene, o-chloro-p-decylstyrene, 3-bromo-4-vinylbutyne-1, p - methoxystyrene, alpha-methylstyrene, vinylnaphthalene, 4-butoxy-5-vinylpentyne-1, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate heptadecyl methacrylate, phenyl acrylate, o-tolyl methacrylate, benzyl ethacrylate, acrylonitrile methacrylonitrile, methacrylamide, N,N-diphenylacrylamide, N,N-di-o-tolylacrylamide, and the like; methyl isopropenyl ketone, methyl vinyl ketone, 1-naphthyl vinyl ketone, methyl vinyl ether, 2-anthryl vinyl ether, vinyl acetate, vinyl arachidate, vinyl chloride, vinylidene chloride, vinylfurane, vinylpyridine, vinylcarbazole, vinylacetylene and other unsaturated hydrocarbons, esters, alcohols, acids, ethers, etc. of the types described, and polymers such as acetal, ethyl cellulose, cellulose acetate, cellulose propionate, cellulose acetate butyrate, nylon, and polycarbonate.

The particulate ink solids comprise a thermoplastic material which has an electromagnetic energy absorption factor substantially greater than the corresponding absorption factor of the substrate film 11 or which has combined therewith a filler material which has an electromagnetic energy absorption factor substantially greater than the corresponding absorption factor of the substrate. To minimize possible deformation of the substrate and to set the ink within a reasonable time it is presently preferred that the absorption factor of the ink be at least twice the value of the absorption value of the substrate. The transfer of electromagnetic energy by induction heating requires that the ink contain an electrically conductive material. As very few thermoplastic materials are electrically conductive to any significant extent, the ink to be inductively heated will usually contain a filler material which is electrically conductive. Examples of suitable filler materials include conductive carbon black, conductive graphite, aluminum, copper, iron, nickel, magnesium, and the like. Where the desired color of the ink is other than the color of the thermoplastic material and/or the electrically conductive filler, the ink can also contain a pigment. Exemplary pigments include titanium dioxide, carbon black, cadmium yellow, cadmium red, iron oxide red and ultramarine blue. Thus in some instances, the pigment can serve as both the colorant and the electrically conductive filler.

The thermoplastic material component of the ink must be bondable to the particular substrate being printed. Thus, the selection of the thermoplastic material for the ink will depend upon the particular substrate. The bonding can be a result of fusing as with polyethylene to polyethylene or mechanical interlock as with polyethylene to a fibrous material such as paper. Examples of materials suitable for use as the thermoplastic component of the ink include polymers of substituted olefins, polyamides, polycarbonates, polyethers, acetal resins and thermoplastic cellulose copolymers. Specific examples include polymers of one or more of the following monomers: olefins such as ethylene, propylene, 1-butene, 1-pentene, 4-methyl-1-pentene, 1-heptene, 1-octene, 1-decene, 3-phenylpropene-1, vinylcyclohexane, and the like; conjugated dienes such as 1,3-butadiene, 2,3-dimethyl-1, 3-butadiene, isoprene, piperylene, 3-furyl-1,3-butadiene, 3-methoxy-1,3-butadiene, and the like; haloprenes, such as chloroprene (2-chloro-1,3-butadiene), bromoprene, 2-ethoxy-1,3-butadiene, methylchloroprene (2-chloro - 3-methyl-1,3-butadiene), and the like; aryl substituted olefins such as styrene; various alkyl styrenes such as o-ethylstyrene, m-tetradecylstyrene, and the like; p-chlorostyrene, p-vinylstyrene, m-methoxy-p-isopropylstyrene, o-chloro-p-decylstyrene, 3-bromo-4-vinylbutyne-1, p - methoxystyrene, alpha-methylstyrene, vinylnaphthalene, 4-butoxy-5-vinylpentyne-1, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, heptadecyl methachylate, phenyl acrylate, o-tolyl methacrylate, benzyl ethacrylate, acrylonitrile, methacrylonitrile, mathacrylamide, N,N-diphenylacrylamide, N,N-di-o-tolyl acrylamide, and the like; methyl isoprepenyl ketone, methyl vinyl ketone, 1-naphthyl vinyl ketone, methyl vinyl ether, 2-anthryl vinyl ether, vinyl acetate, vinyl arachidate, vinyl chloride, vinylidene chloride, vinylfurane, vinylpyridine, vinylcarbazole, vinylacetylene, and other unsaturated hydrocarbons, esters, alcohols, acids, ethers, etc. of the types described, and polymers such as acetal, ethyl cellulose, cellulose acetate, cellulose propionate, cellulose acetate butyrate, nylon, and polycarbonate. For greater retention strength of the ink to the substrate it is presently preferred that the substrate and the thermoplastic component of the ink be the same material, thus requiring that the ink contain in addition to the thermoplastic component a filler material which has an electromagnetic energy absorption factor substantially greater than that of the thermoplastic material.

The conductive filler converts the inductively transmitted electromagnetic energy to heat and thus raises the temperature of the ink. Coil 26 provides sufficient electromagnetic energy for the temperature of the ink to be raised above the melting point of the thermoplastic component of the ink to set the ink onto the substrate. Where fusion as opposed to mechanical interlock is desired, the temperature of the ink will also be raised above the melting point of the substrate. The resulting printed substrate is illustrated in FIGURE 4. The printed substrate can be stored on takeup roll 28.

Referring now to FIGURE 5, there is illustrated a modification of FIGURE 1 wherein a dielectric heater 31 is utilized instead of induction heater coil 26. Dielectric heater 37 comprises an upper plate 32 and a lower plate 33 positioned on opposite sides of substrate film 11. A high frequency A.C. power supply 34 is connected between plates 32 and 33. As with the induction heating the thermoplastic component of the ink must be bondable to the particular substrate, and the absorption factor for the ink should be substantially greater than the absorption factor of the substrate. For dielectric heating the absorption factor can be described in terms of the loss factor which is proportional to the multiplication product of the power factor of the material and the dielectric constant of the material. The thermoplastic component of the ink or a component admixed therewith should have a loss factor at least twice as great as the loss factor of the substrate. Suitable non-conducting high loss factor materials include polar plastics, such as polyvinyl chloride, and materials such as asbestos, cellulose, nylon, barium titanate, calcium titanate, lead titanate, magnesium titanate, high loss factor glass, and the like. If the thermoplastic component and/or the high loss factor filler material does not provide the desired color, a pigment can be added.

Referring now to FIGURE 6, there is illustrated a modification of FIGURE 1 wherein a microwave heater 41 is positioned adjacent the printed surface of film 11. A microwave frequency A.C. power supply 42 is connected to the input terminals of heater 41. Film 11 and the ink should be electrically non-conductive and the ink should have an absorption factor for the microwaves substantially greater than the absorption factor of the substrate. Suitable materials to selectively absorb microwave radiation include materials with a high dipole moment such as rosin. The term absorption factor can be defined as the ability of a material to convert the electromagnetic energy into heat. Thus, the higher the absorption factor, the greater the amount of heat produced from a given amount of electromagnetic energy.

Referring now to FIGURE 7, there is shown a modification of FIGURE 1 wherein the thermoplastic ink in fed in liquid form, for example a solution or dispersion of the thermoplastic component, high absorption filler and pigment, from a container 51 onto roller 52. Roller 52 contacts the raised image areas 53 of printing roller 54 to apply a coating of the ink to the raised areas. The roller 54 then contacts film 11 to transfer the ink image thereto. The ink image is then bonded to the substrate by induction heater 26. Dielectric heater 31 or microwave heater 41 can be utilized instead of or in addition to induction heater 26. While the invention has been described in terms of printing on a sheet or film, it is within the contemplation of the invention to print on other objects, for example bottles, cartons, boxes, and the like.

The following example is presented in further illustration of the invention and should not be construed to unduly limit the invention.

EXAMPLE

A mixture of three parts by weight of a polyethylene having a density of 0.914, a melt index of 22 being ground to 325 mesh, and one part iron powder was made. This was sprinkled in a decorative pattern on a sheet of polyethylene having a density of 0.96 and a melt index of 0.9. This was positioned in Leco induction furnace model 521L for 1 minute. On removal from the furnace the polymer forming the decoration was fused and had adhered to the substrate.

Reasonable variation and modification are possible within the scope of the foregoing disclosure, the drawings and the appended claims to the invention.

I claim:

1. A method of printing on an electrically non-conductive thermoplastic substrate with a normally solid thermoplastic ink containing a thermoplastic component which is bondable to said substrate, said substrate being deformable at the melting point of said thermoplastic component, said thermoplastic ink having an absorption factor for a type of electromagnetic energy substantially greater than the absorption factor of said substrate for said type of electromagnetic energy, which comprises producing with said thermoplastic ink an image comprising said thermoplastic component in solid form on the surface of said substrate; and then subjecting said substrate having said image thereon to said type of electromagnetic energy to selectively heat said thermoplastic ink to melt said thermoplastic component to bond said thermoplastic ink to said substrate without deformation of said substrate.

2. A method in accordance with claim 1 wherein said thermoplastic ink comprises said thermoplastic component, which is electrically non-conductive, and an electrically conductive filler material, and wherein said electromagnetic energy is provided by inductively heating said substrate having said image.

3. A method in accordance with claim 1 wherein said thermoplastic ink comprises said thermoplastic component and a filler material having a loss factor at least twice as great as the loss factor of said substrate, and wherein said electromagnetic energy is provided by subjecting said substrate having said image to dielectric heating.

4. A method in accordance with claim 1 wherein said thermoplastic ink comprises said thermoplastic component and a filler material having an absorption factor at least twice as great as the absorption factor of said substrate, and wherein said substrate is formed of the same thermoplastic material as the thermoplastic component of said thermoplastic ink.

5. A method in accordance with claim 4 wherein said thermoplastic ink further comprises a pigment.

6. A method of printing on an electrically non-conductive thermoplastic substrate which comprises producing electrostatic charges on the surface of said substrate; neutralizing a portion of the electrostatic charges on said surface to form an electrostatic image; depositing a layer of particulate solids on said surface having said electrostatic image; said particulate solids comprising a thermoplastic component which is bondable to said substrate; said particulate solids having at least one component which has an absorption factor for a type of electromagnetic energy substantially greater than the absorption factor of said substrate for said type of electromagnetic energy; said substrate being deformable at the melting point of said thermoplastic component; causing the removal of the particulate solids from the area of said surface not occupied by electrostatic charges to form an image of particulate solids; and then subjecting said substrate having said image of particulate solids to said type of electromagnetic energy to thereby selectively heat said image of particulate solids to melt said thermoplastic component to bond the particulate solids of said image to said substrate without deformation of said substrate.

7. A method in accordance with claim 6 wherein said particulate solids comprise said thermoplastic component, which is electrically nonconductive, and a electrically conductive filler material, and wherein said electromagnetic energy is provided by inductively heating said substrate having said image of particulate solids.

8. A method in accordance with claim 6 wherein said particulate soilds comprise said thermoplastic component and a filler material having a loss factor at least twice the loss factor of said substrate, and wherein said electromagnetic energy is provided by subjecting said substrate having said image of particulate solids to dielectric heating.

References Cited

UNITED STATES PATENTS

| | | | |
|---|---|---|---|
| 3,359,130 | 12/1967 | Goldman | 117—72 |
| 2,448,008 | 8/1948 | Baker. | |
| 3,010,157 | 11/1961 | Cizek | 18—48 |
| 3,012,839 | 12/1961 | Epstein et al. | 117—17.5 X |
| 3,015,305 | 1/1962 | Hall et al. | 252—62.1 |
| 3,034,926 | 5/1962 | Carter et al. | 117—93.2 X |
| 3,052,539 | 9/1962 | Greig | 117—17.5 X |
| 3,079,272 | 2/1963 | Greig | 252—62.1 |
| 3,090,755 | 5/1963 | Erchak | 252—62.1 |
| 3,155,531 | 11/1964 | Fauser et al. | 252—62.1 X |
| 3,170,812 | 2/1965 | Schwartz | 117—93.2 |
| 3,186,860 | 6/1965 | Jones | 117—93.2 |
| 3,190,768 | 6/1965 | Wright | 117—93.2 |
| 3,280,741 | 10/1966 | Seymour | 117—17.5 |

OTHER REFERENCES

Perry, John H., "Chemical Engineers' Handbook," fourth edition, pp. 25–41 through 25–43.

Rothschild, Malcolm V., Production Set-Ups for Fluid Ized-Bed Coating, Modern Plastics, January 1962.

WILLIAM D. MARTIN, Primary Examiner

E. J. CABIC, Assistant Examiner

U.S. Cl. X.R.

117—21, 93.1, 93.2; 118—637